United States Patent Office 2,977,821
Patented Apr. 4, 1961

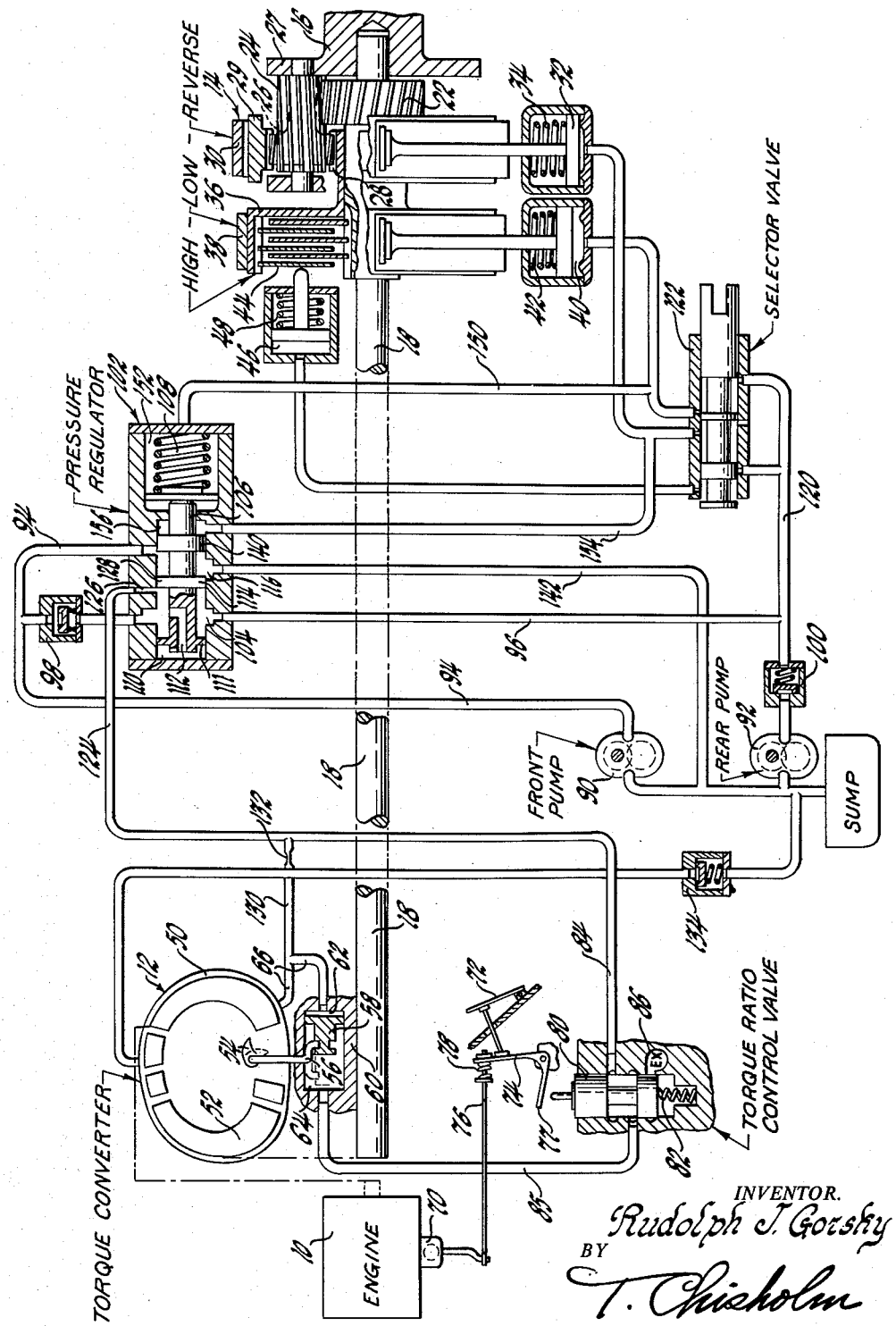

2,977,821

TRANSMISSION

Rudolph J. Gorsky, Fenton, Mich., assignor to General Motors Corporation, Detroit, Mich., a corporation of Delaware Filed Sept. 16, 1955, Ser. No. 534,765

3 Claims. (Cl. 74—732)

This invention relates to the type of power transmission in which a hydrodynamic torque converter drives a change-speed gearing which in turn drives a power output device, such as the propeller shaft of an automobile. An example of this general type of transmission is described in the U.S. Patent to Oliver K. Kelley, 2,818,708, January 7, 1958.

Transmissions of the kind disclosed in that patent have been used extensively and are very satisfactory but they are subject to the limitation that the torque multiplication of the torque converter is dependent solely on the relative speeds of the impeller and the driven rotor or turbine. A result of this is that when the engine is running at maximum speed at a given load, and the car is held at a constant speed, as by a hill, it is impossible to increase the torque ratio of the transmission. There are certain conditions of driving in which it is desired to vary the torque ratio of the converter instantly at the will of the driver and at a given car speed. To put it another way, it is frequently desired to extend the range of speed through which the converter has high torque multiplication, particularly at high speeds, for example, to provide a passing gear. Transmissions of the type shown in the patent cannot be controlled in this way and, accordingly, improvements have been proposed as disclosed in the application for U.S. patent of Oliver K. Kelley, S.N. 403,813 filed Jan. 13, 1954, the disclosure of which is incorporated herein by reference. In the invention disclosed in that application a pressure chamber is provided for adjusting the blades of a reaction member to change the torque ratio of the converter when desired. In transmissions of this type the drive through change speed gearing may be established through friction clutches, operated by fluid pressure chambers. In some transmissions of this type clutch surfaces have been damaged due to slipping although the fluid pressure pumps used to supply oil for control were delivering oil at sufficient capacity to prevent slipping of the clutches.

I have discovered that this slipping is due to temporary localized reduction of pressure due to diversion from the clutch of the volume of oil required to fill the chamber which adjusts the movable blades and to compensate for incidental leakage in the conduit which supplies that chamber. Therefore, it is an object of the present invention to improve the operation of and extend the usefulness of transmissions having change-speed gearing in series with a hydrodynamic troque converter in which the range of torque multiplication may be varied and especially to do this by providing a transmission in which the pressure chamber for controlling the torque ratio cannot be supplied with liquid until sufficient pressure is established in the fluid pressure clutch chambers to operate the clutches without slipping. More specifically this may be accomplished by opening the supply from the source of pressure to the torque ratio control chamber only in response to the existence of a predetermined pressure in the clutch chamber or in its supply line.

These and other objects of the present invention will be apparent from the following description and accompanying drawings, which show schematically one form of transmission and control system therefor, embodying the invention.

Referring to the drawings:

An engine 10 drives a hydrodynamic torque converter 12 which drives a change-speed gearing generally denoted by 14, which in turn drives a power output shaft 16 which may be the propeller shaft of an automobile. Any suitable form of change-speed gearing may be used, for example a planetary gearset having two forward speeds and reverse, as disclosed in the patent referred to. The shaft 18 by which the torque conveter drives the gearing, includes a sun gear 22, which meshes with a plurality of long planetary pinions 24, the forward ends of which also mesh with short planetary pinions 26, both sets of planetary pinions being mounted on a carrier 27 which drives output shaft 16. The short planetary pinions 26 also mesh with both a reaction sun gear 28 which can turn free on the shaft 18. The short pinions also mesh with a ring gear 29, which latter may be locked to the frame to act as a reaction gear by a reverse brake band 30, which can be set when desired by any suitable expansible chamber motor or servo having a fluid pressure chamber 32. The brake is released by its inherent elasticity and by a spring 34. The sun gear 28 is attached to a drum 36 which can be locked to the frame by a low speed brake band 38 operable by a second expansible chamber motor or servo having a fluid pressure chamber 40, or released by its inherent elasticity and a spring 42. The reaction sun gear 28 may also be locked to the gearing input shaft 18 by a direct drive clutch 44 which may be set by a hydraulic servo having a fluid pressure chamber 46 and released by a spring 48. This gearing provides one-to-one or high speed forward driven when the clutch 44 is engaged, low forward speed when the band 38 is set and reverse drive at low speed ratio when the band 30 is set. Thus each of the clutch 44 and bands 30, 38 is a normally disengaged torque establishing device which can establish a driving connection between the torque converter and the output shaft 16.

The torque converter generally designated by 12 may be of any suitable type in which there is means for varying the range of torque multiplication or torque ratio. Preferably, the range of torque ratio is varied by changing the angle of vanes which direct the liquid in the working space. This may be accomplished either by varying the angle of the blades in a turbine or driven rotor or by varying the angle of the blades of a reaction member as shown in the application of Oliver K. Kelley, S.N. 403,813 filed Jan. 13, 1954. As illustrated herein, by way of example, the torque converter has an impeller 50 driven by the engine, a turbine 52 connected to drive the shaft 18 and a reaction device which may be constructed as shown in detail in the Kelley application S.N. 403,813, and which includes pivoted reaction vanes 54, each mounted on a crank 56. The ends of the cranks are mounted in a circumferential groove in an annular piston 58, one-half of a longitudinal section of which is shown in the drawing. The piston divides an annular cylinder 60 into two expansible or fluid pressure chambers 62 and 64. Each such chamber, with the piston 58, constitutes a servo or motor for moving the blades 54. These blades and their pivots are disposed radially with respect to the shaft 18 and the arrangement is such that when piston 58 is in the dotted line position at the left of the cylinder 60, as the drawing is viewed, the reaction blades 54 are in high performance position in which they deflect, thru a high angle, liquid flowing from the turbine 52 to the impeller 50 and thus effect a high torque ratio, as is known. This is, therefore, referred to as the high angle position. When the piston 58 is in the full line position at the right of the cylinder 60, as shown in the drawing, the blades 54 deflect the liquid thru a lower angle, providing a lower torque ratio. This is called the low angle or low performance position.

I provide means constantly urging the blades toward the high torque position. In the example shown this is the fluid pressure motor constituted by piston 58 and chamber 62 which is constantly connected to the conduit 66 which supplies oil to the converter working space which conduit, under operating conditions, is a source of fluid under pressure, as will be explained. The force of the fluid pressure in chamber 62 may be overcome by the force of the fluid pressure on the piston in cylinder 64, which when desired may be supplied with oil under pressure to move the vanes to low torque position. If the areas of the two faces of the piston 58 are equal the chamber 64 will be supplied with fluid at a higher pressure than the pressure in the chamber 62.

The engine has the usual throttle 70 actuated by the usual accelerator pedal 72 through one arm 74 of a bell crank which urges a throttle control rod 76 to the left, as shown in the drawing, through a lost motion connection such as compression spring 78. The throttle is opened by foot pressure on the pedal 72 and closed by any suitable return spring, not shown. After the throttle is fully open the pedal 72 can be moved still farther against the compression of the spring 78 so that the other arm 77 of the bellcrank depresses and closes a control valve 80 normally urged up by a spring 82 to an open position which can supply oil under pressure from a conduit 84 through a conduit 85 to the low angle control or holding chamber 64. The control valve 82 is held in its upper position by the spring during normal operation of the pedal 72. The pressure in line 84 is greater than the pressure in the converter as will be explained, so that the force in chamber 64 on the piston 58 overcomes the force in chamber 62 on the piston and holds the vanes 54 in the position of low torque multiplication. Over travel of the pedal 72 moves the valve 80 down to close the conduit 84 and vent the chamber 64 through line 85 to exhaust port 86. This leaves the vanes under the control of constantly filled high angle control chamber 62 which moves them to the position of high torque multiplication.

The ultimate source of oil under pressure for all operation and control is constituted by the customary front pump 90 driven by the engine or by the impeller 50 and the customary rear pump 92 driven by the propeller shaft 16 which pumps draw oil from the sump, and supply oil under pressure through conduits 94 and 96, respectively, and check valves 98 and 100, respectively, the control system, as is known. The pumps, and particularly the front pump, supply oil to a pressure regulating and selector valve generally designated by 102 which is an exemplary form of a device which assures sufficient pressure for operating the clutches without slipping before the high torque ratio control chamber 64 can be supplied.

The pumps deliver oil to the chamber 104 of the regulator valve which chamber may be considered a source of liquid under regulated pressure for operating all controls and for charging the torque converter. The valve 102 includes the valve stem 106 constantly urged to the left by spring 108 against the force exerted by the oil in regulating chamber 110 behind piston or land 111. Oil is admitted to the regulating chamber 110 from chamber 104 by duct 112. Whenever the pressure in chambers 104 and 110 tends to exceed the value for which the spring 108 is set, land 114 uncovers vent port 116 leading to the sump and so prevents further increase in pressure. This arrangement constitutes a constant pressure regulator as is known. Oil at this constant pressure is supplied by conduits 96 and 120 to a manual selector valve 122 which can selectively deliver oil to any one of the drive-establishing chambers 32, 40 or 46.

The converter and torque ratio control cylinders 62 and 64 are supplied with oil under pressure through a conduit 124 leading from a port 126 which is controlled by land 128 on the valve stem 106. Whenever the pressure in chamber 104 is below the value necessary to operate any of the torque-establishing devices without slipping (as determined by the force of the spring 108) land 128 closes port 126 and prevents oil from entering line 124. This also prevents oil draining from the working space of converter 12 when the transmission is idle. Whenever the pressure in chamber 104 and line 96 reaches the value necessary to operate the torque-establishing devices without slipping, land 128 opens port 126 and the converter 12 and torque ratio control chambers 62, 64 may be supplied. The high torque ratio control cylinder 62 is supplied through conduit 130, which connects conduit 66 to conduit 124 through a restriction 132. Conduit 130 therefore also charges the working space of the converter, as is known, and oil is returned from the converter to the sump through a pressure relief valve 134. The restriction 132 and pressure relief valve 134 constitute means for maintaining in the converter and in chamber 62 a pressure lower than the pressure in valve space 104 and line 124. Line 84 which supplies the low torque ratio holding chamber 64 is connected to line 124 and so provides pressure in chamber 64 equal to that in valve chamber 104.

Whenever the pressure of the rear pump reaches a predetermined value in the valve chamber 104, a land 140 on the valve stem 106 connects front pump discharge conduit 94 to the sump through a vent conduit 142. This permits check valve 98 to close and causes the front pump to be relieved or to idle and allows the rear pump to supply operating pressure, as is known.

It is desirable to maintain higher control pressure when operating in low gear and in reverse than when operating in direct drive. To accomplish this the low band apply chamber 40 is connected by a conduit 150 to a low gear boost chamber 152 so that whenever the low band is applied, pressure of oil assists the spring 108 in urging valve stem 106 to the left and so maintains a higher pressure in the control system and in chamber 40. Likewise this requires a higher pressure in the control system before the torque ratio control conduit 124 is opened.

The reverse band apply chamber 32 is similarly connected by a conduit 154 to a reverse boost chamber 156 behind land 140 so that whenever the transmission is in reverse oil pressure on land 140 assists spring 108 to urge the valve to the left, raising the pressure in the control system, as when in low gear.

*Operation*

Whenever it is desired to operate the transmission the manual valve 122 is moved to the appropriate position to fill the selected chamber 32, 40 or 46. This places the gearing in the selected ratio and establishes drive. The regulator valve spring 108 is calibrated so that with the appropriate booster pressure, if any in chamber 152 or 156, sufficient pressure is normally maintained in the line 96 to operate any torque-establishing device without slipping. The port 126 is now open, the converter 12 is charged with oil at a pressure below that in chamber 104, the high torque ratio control cylinder 62 is supplied at the pressure of the converter, the torque ratio control valve 80 is up, or open, and the low torque ratio holding cylinder 64 is filled at the higher pressure of the valve chamber 104. This overcomes the pressure in chamber 62 and holds the piston 58 in the low torque ratio position shown in solid lines in the drawing, maintaining the lower torque ratio range in the torque converter. Whenever the high torque ratio range is desired, the throttle pedal is pushed past full-open position which depresses valve 80 to vent chamber 64 and permit the pressure in the high torque control chamber 62 to move the blades 54 to high torque ratio position.

In previously known transmissions of this general type it sometimes happens that the volume of oil admitted to the torque ratio control chamber is so great in relation to the instantaneous capacity of the front pump at the particular operating speed that the pressure in valve chamber 104 and the clutch supply line 96 is temporarily reduced below the pressure normally maintained by the regulator valve, that is below the pressure required to engage the clutches without slipping. The arrangement of the regulator valve land 114 and port 126 and the booster chambers 152 and 156 assures that the appropriate selected drive establishing device will be engaged at its proper pressure before oil can be diverted to the torque ratio control devices, and if drive is established in low or reverse the higher pressure required will be attained before oil can be diverted from the drive establishing device.

I claim:

1. A transmission comprising in combination an impeller adapted to circulate liquid through a turbine; means for variably changing the direction of flow of liquid between the impeller and turbine; an output member; a disengageable torque transmitting connection from the turbine to the output member; a first fluid pressure chamber for engaging said connection; actuating means for moving the flow direction changing means; means constantly urging the actuating means toward one position; a second fluid pressure chamber for overcoming the urging means and moving the actuating means to a second position; means for supplying pressure fluid to the first chamber; and means responsive to the pressure in the first chamber for supplying pressure fluid to the second chamber.

2. A transmission comprising in combination an impeller adapted to circulate liquid through a turbine; means for variably changing the direction of flow of liquid between the impeller and turbine; an output member; a disengageable torque transmitting connection from the turbine to the output member; a first fluid pressure chamber for engaging said connection; actuating means for moving the flow direction changing means; means constantly urging the actuating means toward one position; a second fluid pressure chamber for overcoming the urging means and moving the actuating means to a second position; means for supplying pressure fluid to the first chamber; means responsive to the pressure in the first chamber which supplies pressure fluid to the second chamber, and manually operable means for preventing passage of fluid to the second chamber while venting the second chamber.

3. A transmission comprising in combination a rotatable impeller for circulating liquid, a turbine receiving liquid from the impeller, movable vanes for variably changing the direction of flow of liquid from the turbine to the impeller, an output member, a disengageable torque transmitting connection between the turbine and the output member, a first fluid pressure chamber for engaging said connection, a pump driven in response to rotation of the impeller for supplying liquid under pressure to the first chamber, a piston connected to the vanes for determining the amount of change of direction of liquid between the turbine and impeller, a second fluid pressure chamber adapted when supplied with liquid from the pump constantly to urge the piston in one direction, a third fluid pressure chamber for overcoming the force of the second chamber and moving the piston in the opposite direction, means connecting the pump to the second chamber, and means responsive to the pressure in the first chamber for connecting the pump to the third chamber.

References Cited in the file of this patent

UNITED STATES PATENTS

| | | |
|---|---|---|
| 2,292,482 | Roche | Aug. 11, 1942 |
| 2,570,889 | Van Lammeren | Oct. 9, 1951 |
| 2,675,102 | Robinson | Apr. 3, 1954 |

FOREIGN PATENTS

| | | |
|---|---|---|
| 1,118,910 | France | Mar. 26, 1956 |

OTHER REFERENCES

Publication, General Motors Engineering Journal, May–June 1956, page 39.